Patented Oct. 24, 1922.

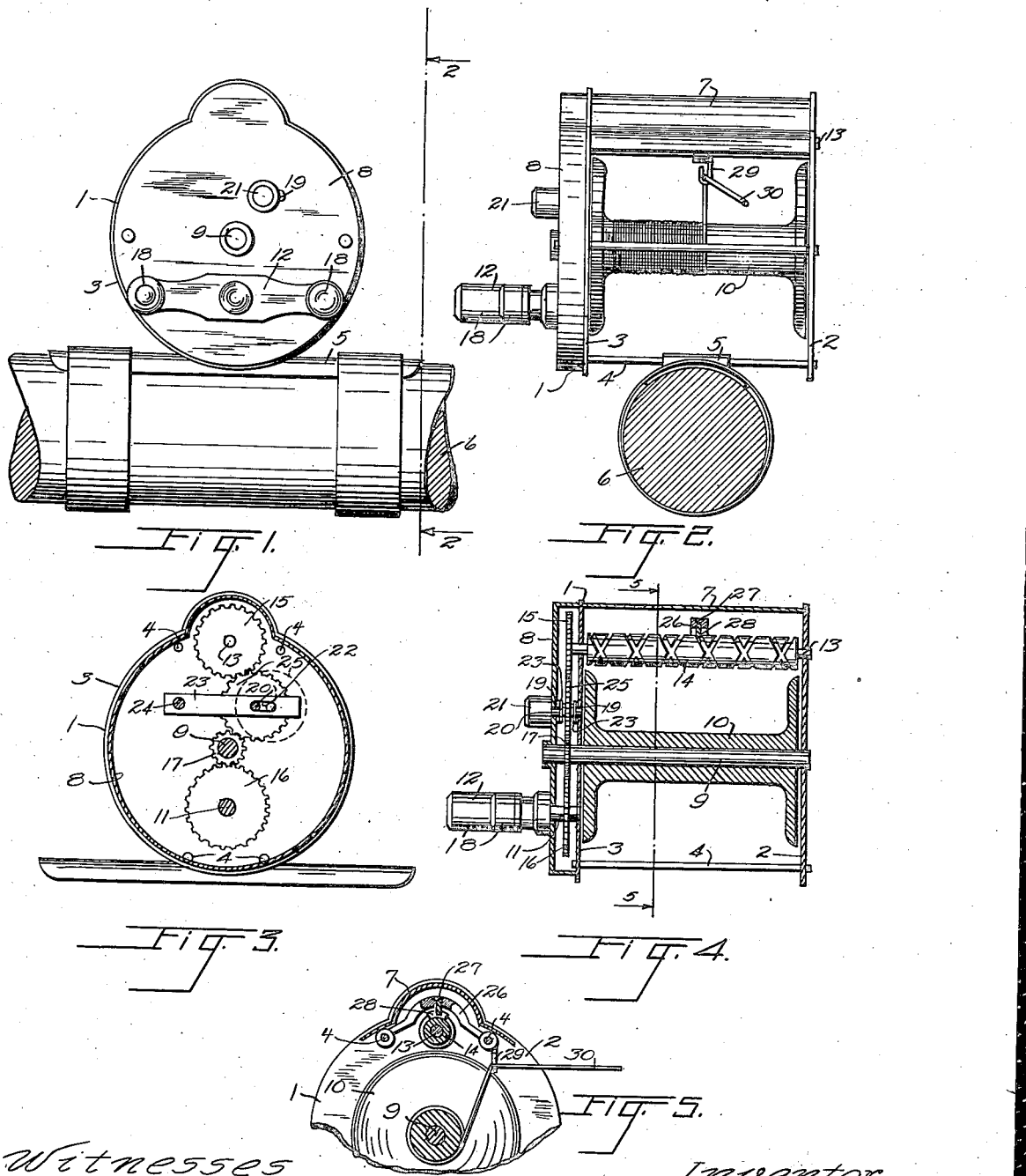

1,432,988

UNITED STATES PATENT OFFICE.

ERICK ALBERT ERICKSON, OF IRON RIVER, MICHIGAN, ASSIGNOR OF ONE-THIRD TO BENJAMIN ERICKSON AND ONE-THIRD TO JOHN ERICKSON, BOTH OF IRON RIVER, MICHIGAN.

FISHING REEL.

Application filed May 13, 1920. Serial No. 381,003.

*To all whom it may concern:*

Be it known that I, ERICK ALBERT ERICKSON, a citizen of the United States, residing at Iron River, in the county of Iron and State of Michigan, have invented certain new and useful Improvements in Fishing Reels, of which the following is a specification.

This invention relates to improvements in fishing reels. One object is to provide a fishing reel wherein the spool and the line guide carriage shaft are releasably connected so that the line may be disconnected from the guide line when casting. A further object is to position the line guide carriage shaft above the spool and in the very top of the reel frame whereby water, grit, and extraneous matter generally are excluded therefrom. A further object is to provide a fishing reel of simple construction, cheap to manufacture and efficient in operation. With the foregoing and other objects in view the invention consists in the combination and arrangement of parts to be hereinafter fully described, pointed out in the appended claim and illustrated in the accompanying drawing which forms a part of this specification and in which—

Fig. 1 is a view of my casting reel in end elevation illustrating its application.

Fig. 2 is a view taken on line 2—2 of Fig. 1.

Fig. 3 is a view through one end of the reel in a plane parallel to the line 5—5 of Fig. 4.

Fig. 4 is a longitudinal sectional view through the reel.

Fig. 5 is a section on line 5—5 of Fig. 4.

Like reference characters denote corresponding parts throughout the several views.

The reference numeral 1 denotes the reel frame comprising the end plates 2, 3 connected by the pillars 4, two of said pillars being connected by the securing plate 5 to the rod 6 whereby the reel frame is supported. The upper ends of the end plates are formed with aligned grooves to receive the ends of the cover plate 7 and the end plate 3 is formed with a marginal outer groove to receive the cap or head plate 8. The end plates and cap are perforated to receive the spool shaft 9 to which the spool 10, disposed between the said end plates, is made fast. The cap and plate 3 are perforated to receive the stub shaft 11 that is rotated by the handle or crank 12. The end plates are perforated to receive the rotary shaft 13 whereon the reversely threaded carriage shaft 14 is arranged, said shaft being projected into the cap 8 and provided at this end with the gear 15. The stub shaft 11 is provided with a gear 16 in mesh with a pinion 17 fast upon the spool shaft 9 so that rotation of said stub shaft by the crank 12, through the medium of handles 18, rotates the spool 10.

The cap 8 and end plates 3 are formed with the aligned elongated slots 19 through which the sliding shaft 20 extends that is provided with the stud 21 disposed upon the outer face of the cap 8. The shaft 20 extends through elongated slots 22 in the aligned leaf springs 23 which are terminally secured upon the stud 24 connecting the cap 8 and end plate 3, the slots 22 in said springs being in alignment with the slots 19 aforesaid. Between the springs 23 and loose upon the shaft 20 is the gear 25 adapted for releasable engagement with the gear 15, of shaft 13, and pinion 17. When the shaft 20 is moved into the position shown dotted in Fig. 3, by means of stud 21, the gear is moved out of engagement with pinion 17 and gear 15 and the shaft 13 is idle. When the shaft 20 is moved to the position shown in full lines in Fig. 3 the gear 25 is in mesh with said members 15, 17 and the shaft 13 rotated by rotation of the said crank 12.

A carriage 26 has its ends perforated for sliding support upon two of the pillars 4, the intermediate or body portion of said carriage being supported upon a pin 27 supported by a shoe 28 that travels in the reversely threaded portion of the carriage shaft 14 so that the carriage is caused, by rotation of said shaft, to travel back and forth thereover in a well known manner. The carriage is provided with a line guide 29 that releasably carries the line 30 adapted to be wound upon or unwound from the spool 10. To wind the line upon the spool in a uniform manner the shafts 9 and 13 are connected by the sliding gear 25 as previously described. When the line is to be unwound from the spool it is manually lifted out of the line guide and the shafts 9 and 13 disconnected.

What is claimed is:—

In a reel, the combination with end plates, a cap for one of said end plates, a carriage shaft connecting said end plates, a carriage arranged for oscillatory travel thereon, a line guide on said carriage, a spool shaft connecting said end plates and cap, a spool on said shaft, a pinion carried by said carriage shaft, and in the cap, and a pinion in said cap carried by said spool shaft, of a stud on the cap and projecting inwardly thereof, a pair of leaf springs terminally secured on said stud within the cap, said cap and springs being provided with aligned elongated slots, a stub shaft slidably journalled in the spring leaf slots, a pinion carried by said stub shaft and adapted to mesh with the carriage and spool shaft pinions, and a stud on said stub shaft projecting through the slot in said cap for moving said stub shaft to mesh or unmesh said pinions.

In testimony that I claim the foregoing as my own I have hereto affixed my signature in the presence of two subscribing witnesses.

ERICK ALBERT ERICKSON.

Witnesses:
MARTIN FLOOD,
JOHN ERICKSON.